(12) United States Patent
Koster et al.

(10) Patent No.: US 6,729,372 B1
(45) Date of Patent: May 4, 2004

(54) TREE DELIMBER

(76) Inventors: Susan Koster, 86 Elizabeth Street, Lower King, Western Australia (AU), 6330; Stephen Koster, 52 Elizabeth Street, Lower King, Western Australia (AU), 6330

( * ) Notice: Subject to any disclaimer, the term of this patent is extended or adjusted under 35 U.S.C. 154(b) by 0 days.

(21) Appl. No.: 10/350,975

(22) Filed: Jan. 23, 2003

(51) Int. Cl.[7] ............................................. A01G 23/095
(52) U.S. Cl. .................................... 144/343; 144/24.13
(58) Field of Search ............................ 144/4.1, 24.13, 144/338, 343

(56) References Cited

U.S. PATENT DOCUMENTS

| | | | | |
|---|---|---|---|---|
| 2,707,007 A | * | 4/1955 | Shuff ....................... | 144/208.8 |
| 3,536,113 A | * | 10/1970 | Sutherland ................. | 144/336 |
| 3,643,708 A | * | 2/1972 | Lindblom ................. | 144/24.13 |
| 3,941,174 A | * | 3/1976 | Oldenburg ................ | 144/208.8 |
| 4,049,032 A | * | 9/1977 | Oldenburg ................ | 144/24.13 |
| 4,781,228 A | * | 11/1988 | Vaders ..................... | 144/24.13 |
| 5,086,819 A | * | 2/1992 | Selby ....................... | 144/24.13 |

FOREIGN PATENT DOCUMENTS

AU        54497/01        1/2002

* cited by examiner

*Primary Examiner*—W. Donald Bray
(74) *Attorney, Agent, or Firm*—Kirk Hahn

(57) ABSTRACT

A delimber (10) for removing secondary limbs from a primary limb of a tree Comprises an arm (12) arranged to extend around the primary limb. The arm is provided with cutter segments (18) oriented to cut the secondary limbs from the primary limb of the tree. The delimber also comprises a means (50, 52, 54) for moving the arm at least partly along the length of the primary limb. In use, the arm is extended around the primary limb of the tree and is then moved along the length of the primary limb, thereby cutting secondary limbs from the primary limb.

42 Claims, 8 Drawing Sheets

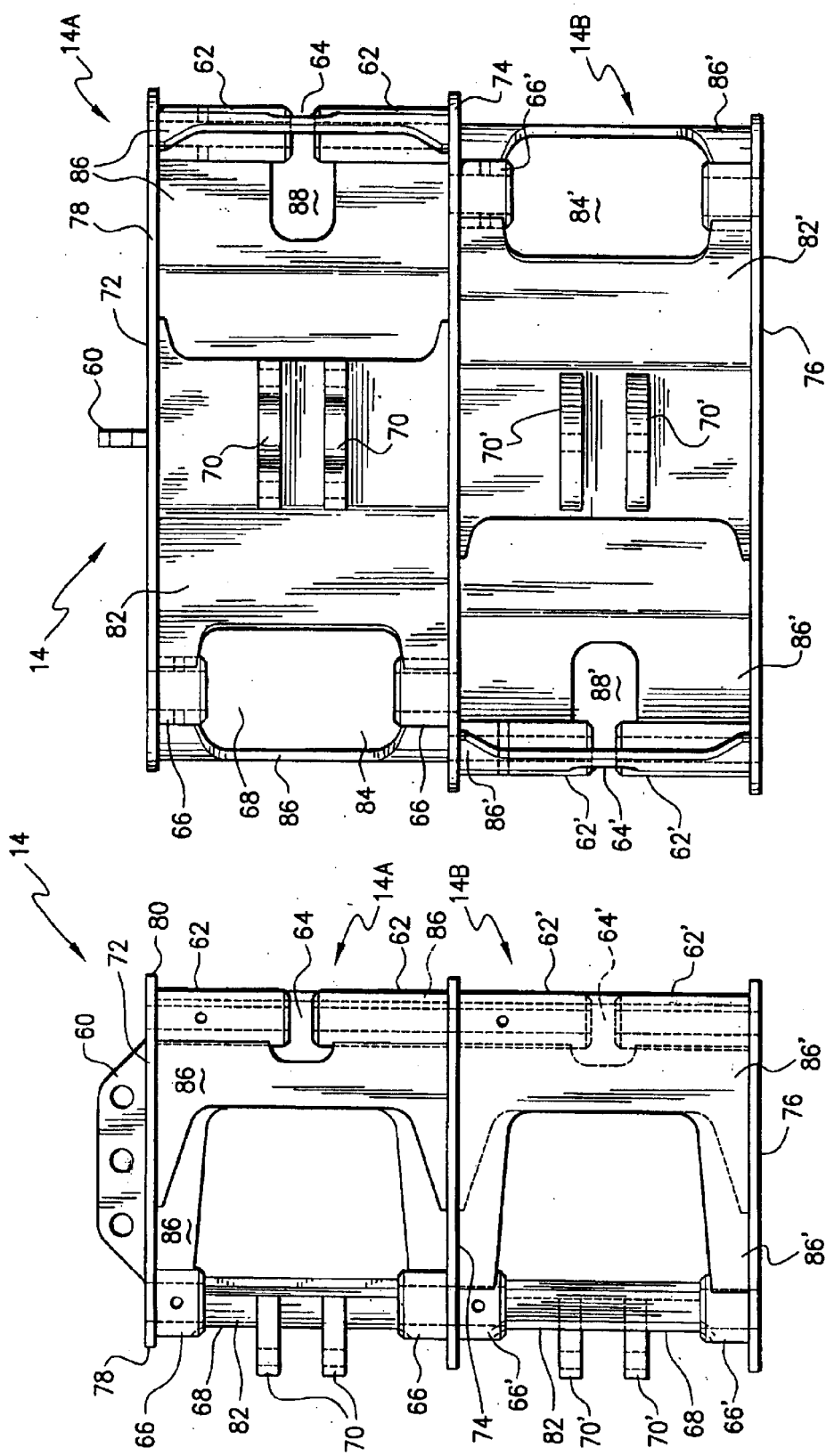

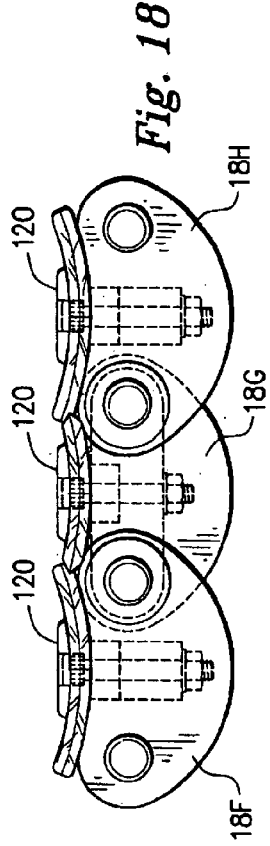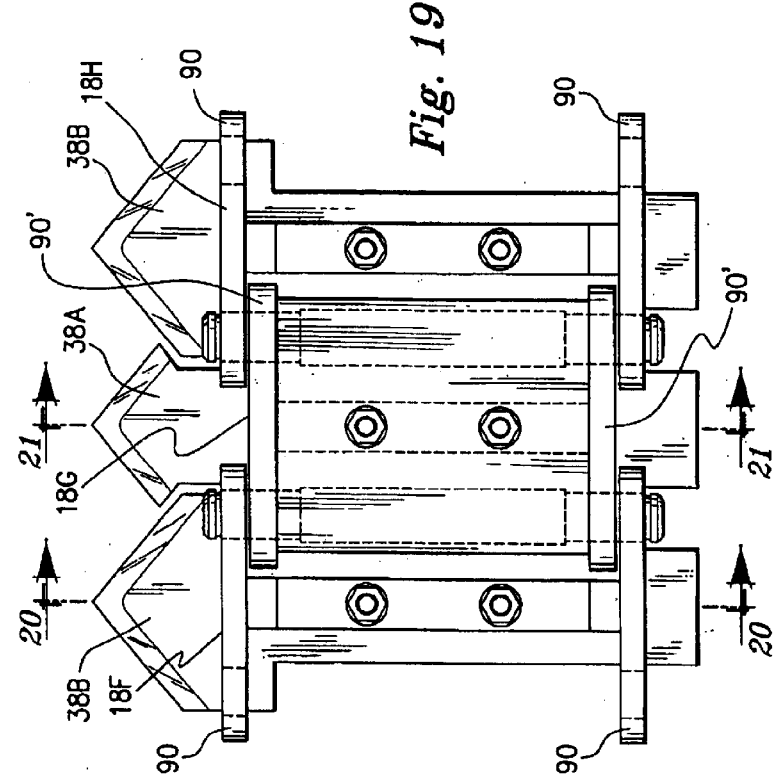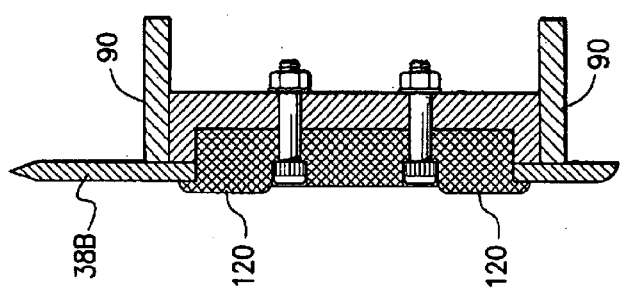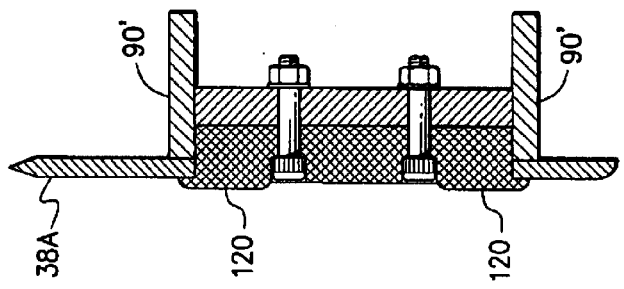

TREE DELIMBER

BACKGROUND OF THE INVENTION

The present invention relates to a delimber for removing limbs from a trunk of a tree.

It can be useful to remove the limbs from a tree for purposes of pruning the tree, for example, to influence its growth or to make felling and harvesting of the tree easier. A current method of delimbing a tree is to use a chainsaw or manual implement to saw through each limb thereby removing it. This method is inefficient.

BRIEF SUMMARY OF THE INVENTION

An object of the present invention is to provide a delimber that is more efficient than the currently used method of cutting each limb using a chainsaw.

According to the present invention there is provided a delimber for removing secondary limbs from a primary limb of a tree, the delimber comprising at least:

an arm arranged to extend around the primary limb, the arm being provided with a cutting means oriented to cut the secondary limbs from the primary limb of the tree; and a means for moving the arm at least partly along the length of the primary limb, whereby, in use, the arm is extended around the primary limb of the tree and is then moved along the length of the primary limb, thereby cutting secondary limbs from the primary limb.

Preferably, in use, the primary limb is the trunk of the tree and the secondary limbs are branches of the tree.

Preferably, the arm includes a plurality of segments pivotally joined together in sequence. Typically, each segment is provided with a blade, the blades of the segments collectively forming the cutting means.

Preferably, the arm is one of a pair of arms arranged to extend around the trunk. Typically, one of the arms extends around the trunk in a clockwise direction while the other arm extends around the trunk in an anticlockwise direction. Preferably, the arms are vertically offset from one another.

Preferably, every second segment is provided with a large blade, and the other segments are provided with smaller blades.

Preferably, each arm is provided with a spacing means to space the cutting means a predetermined distance from the trunk. Typically, each segment is provided with a roller or pad arranged to space the blade of the segment a predetermined distance from the trunk.

Preferably, each arm includes a rigid curved member arranged to extend the segments around the trunk, in use, as the curved member is pivoted. Typically a first segment locates the delimber in relation to the trunk.

Preferably, the first segment is fixed to a moveable body. Typically, each curved member pivots in relation to the body at a point spaced from the first segment.

Also according to the present invention there is provided a method of removing secondary limbs from a primary limb of a tree, including the steps of:

extending an arm around the primary limb of the tree;

moving the arm at least partially along the length of the primary limb thereby causing a cutting means of the arm to remove secondary limbs of the primary limb as the arm moves along the length of the primary limb.

BRIEF DESCRIPTION OF THE SEVERAL VIEWS OF THE DRAWING

In order to provide a better understanding, a preferred embodiment of the present invention will now be described in detail, by way of example only, with reference to the accompanying drawings in which:

FIG. 5 is a side elevation of body of the delimber of FIG. 1;

FIG. 6 is an end elevation of the body of FIG. 5;

FIG. 18 is a plan view of three segments of the arm of the embodiment of FIG. 16;

FIG. 19 is a side elevation of the segments of FIG. 18;

FIG. 20 is a cross-sectional side view of the one of the end segments of FIG. 18; and FIG. 21 is a cross-sectional side view of the middle segment of the segment of FIG. 18.

DETAILED DESCRIPTION OF THE INVENTION

Figure 1:
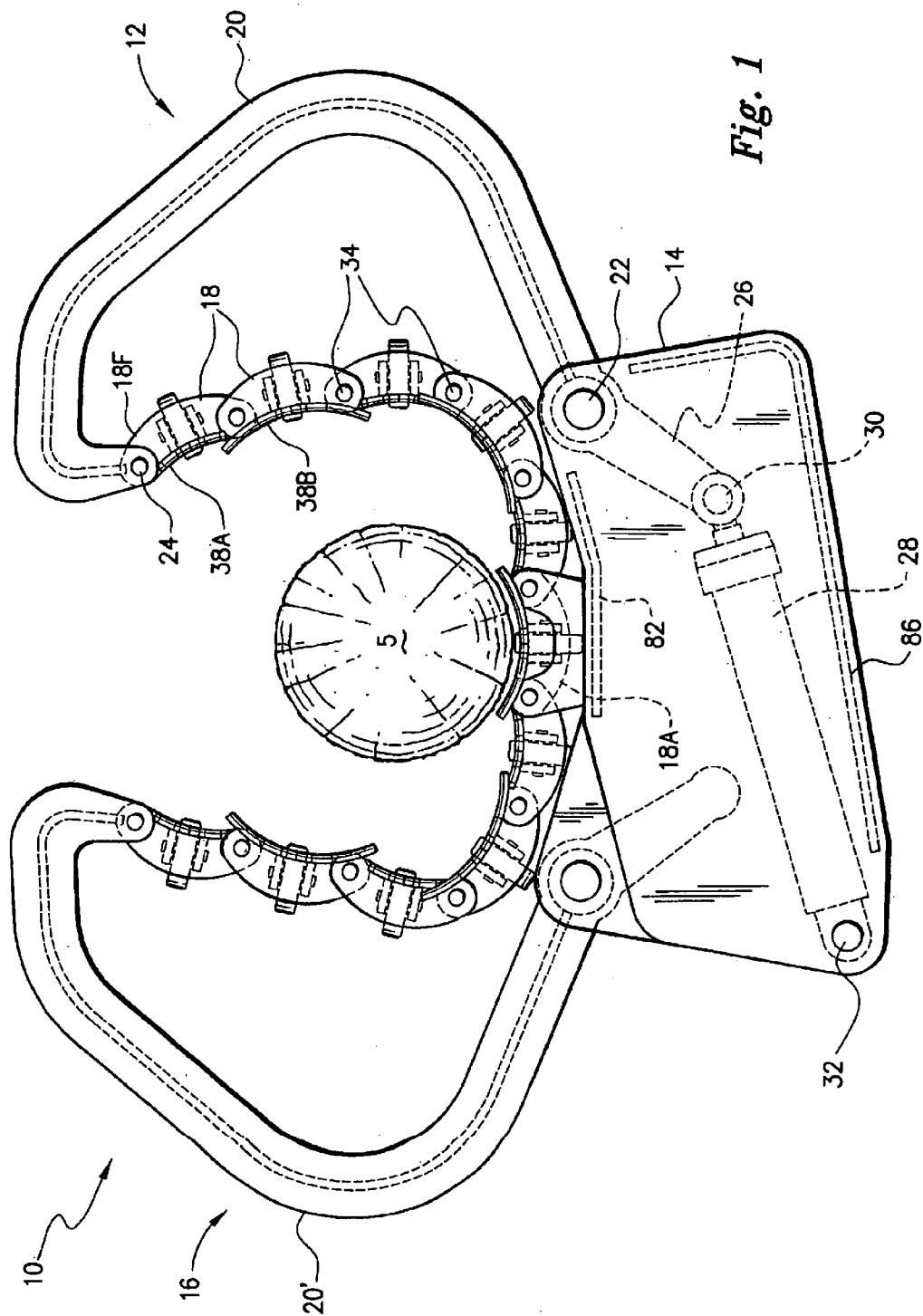
FIG. 1 is a plan view of a first preferred form of a delimber in accordance with the present invention.

Referring to FIG. 1, there is shown a tree delimber 10 for delimbing a primary limb of a tree, such as a trunk 5. The tree delimber 10 includes a first arm 12 that extends anti-clockwise around the tree trunk 5 and a second arm 16 that extends clockwise around the tree trunk 5. The arms 2 and 16 are vertically offset from one another so that as they extend around the tree trunk 5 they do not interfere with each other. For convenience only arm 12 will be described in detail, however arm 16 has corresponding features to arm 12.

Arm 12 includes a plurality of segments 18 pivotally connected to one another at 34. The arm 12 also includes a rigid curved member 20 that is connected to the end segment 18F by a pivotal connection 24. Each of the segments 18 includes a blade 38 orientated to cut protruding, secondary limbs (branches) from the primary limb (trunk). The blades 38 alternate between a large blade 38B, on a first segment 18A, and a small blade 38A, on every other segment 18, up to the end segment 18F (which has the small blade 38A).

The first segment 18A is fixed to a body 14. The body 14, in plan view, is substantially rectangular. The first segment 18A is fixed substantially centrally of one of the longer sides of the rectangle. The curved member 20 is pivotally connected to the body 14 at a right hand corner of the rectangle, coinciding with the same side the first segment 18A is fixed to. The curved member 20 includes a lever portion 26 extending from the pivotal connection 24. A ram 28 is pivotally connected at 30 to the opposite end of the lever portion 26. The opposite end of the ram 28 is pivotally connected at 32 to an opposite corner of the body 14.

Figure 2:
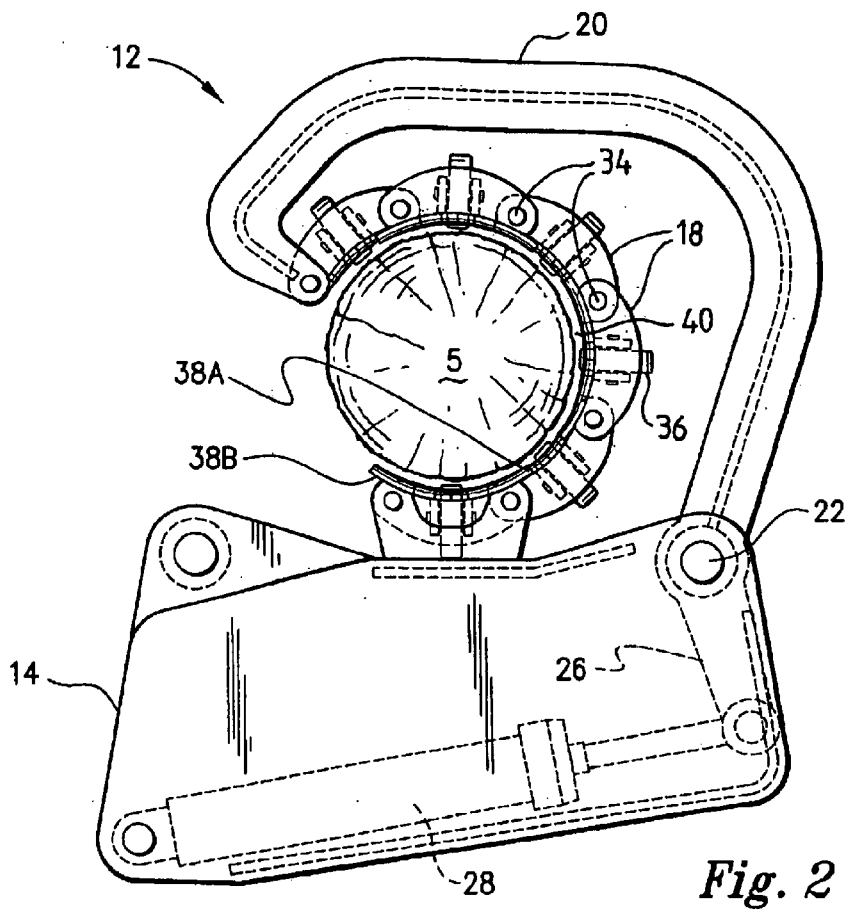
FIG. 2 is a plan view of an arm of the delimber of FIG. 1 extended around a large sized tree trunk.

Referring to FIG. 2, the arm 12 is shown extended around the tree trunk 5. The ram 28 has been extended to move the lever portion 26, which has caused the rigid curved member 20 to pivot about the pivot point 22, which has in turn, caused the segments 18 to extend around the tree trunk 5.

Each segment 18 includes a roller 36 for providing a gap 40 between the tree trunk 5 and the segment 18 and in particular the blade 38 of each segment 18. The roller 36 allows the segments 18 to move along the length of the tree trunk 5 while maintaining each of the blades 38 at small distance from the tree trunk 5.

Figure 3:
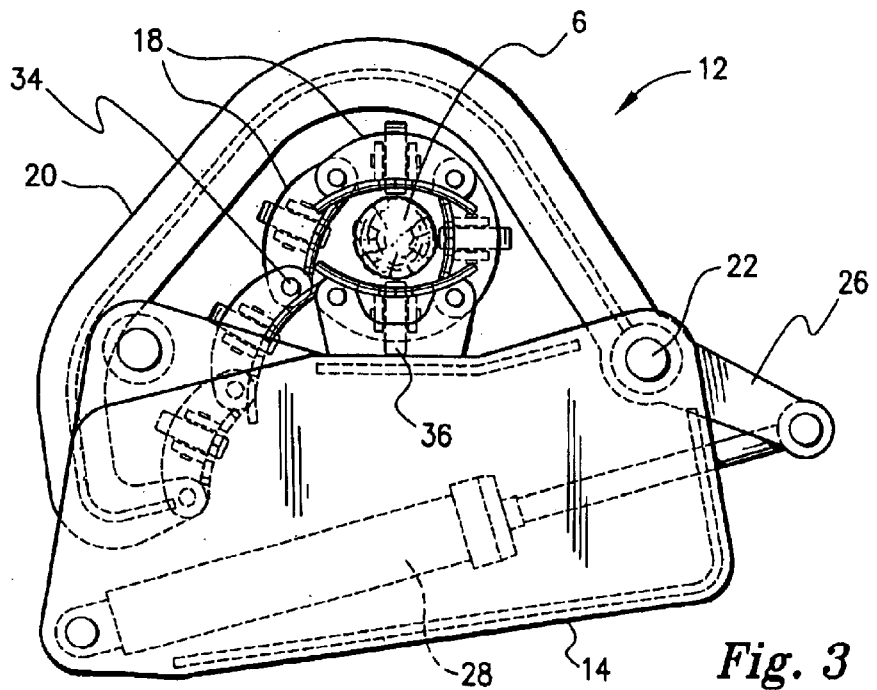
FIG. 3 is a plan view of an arm of the delimber of FIG. 1 extended around a small tree trunk.

Referring to FIG. 3, the arm 12 is shown extended around a smaller tree trunk 6. In this case only a few of the segments 18 are needed to extend around the circumference of the tree trunk 5. It can be seen that the arm 12 can extend around a range of diameters of tree trunk 5.

Figure 4:
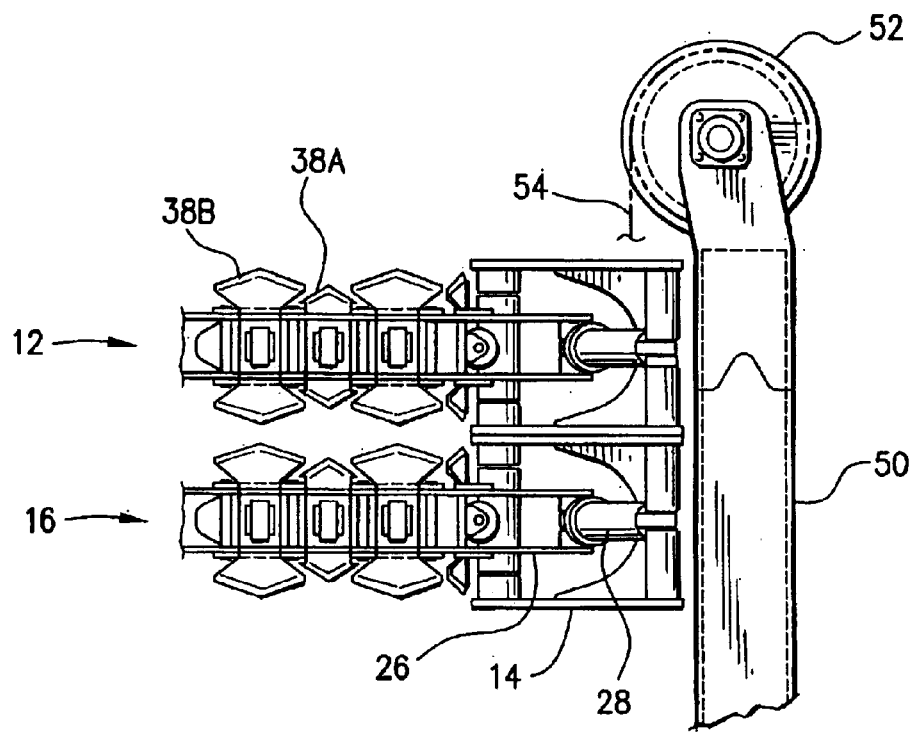
FIG. 4 is a side elevation of the delimber of FIG. 1 including a lifting tower.
Figure 7:
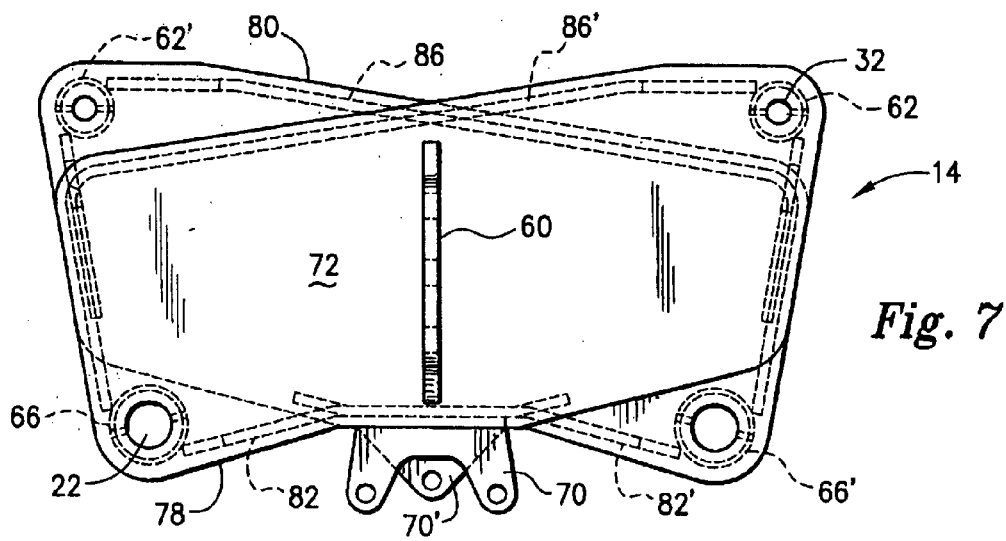
FIG. 7 is a plan view of the body of FIG. 5.
Figure 8:
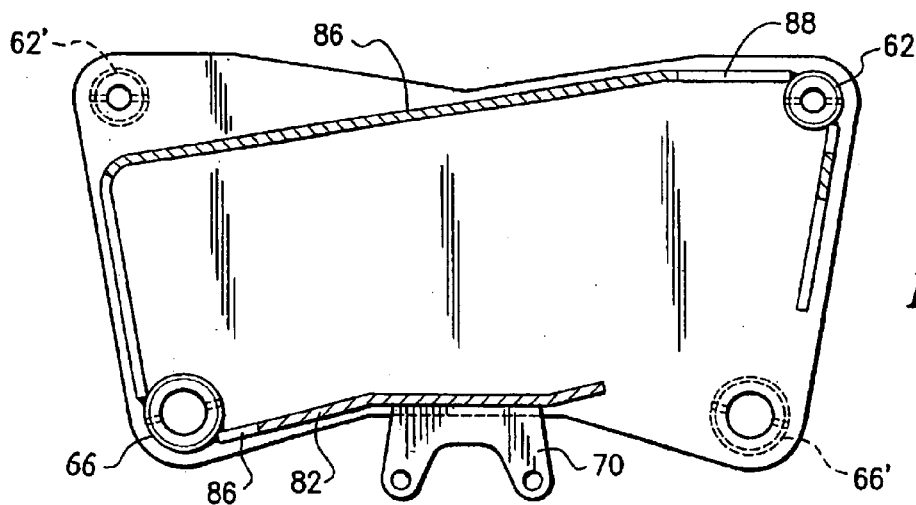
FIG. 8 is a plan view of an upper portion of the body of FIG. 5.
Figure 9:
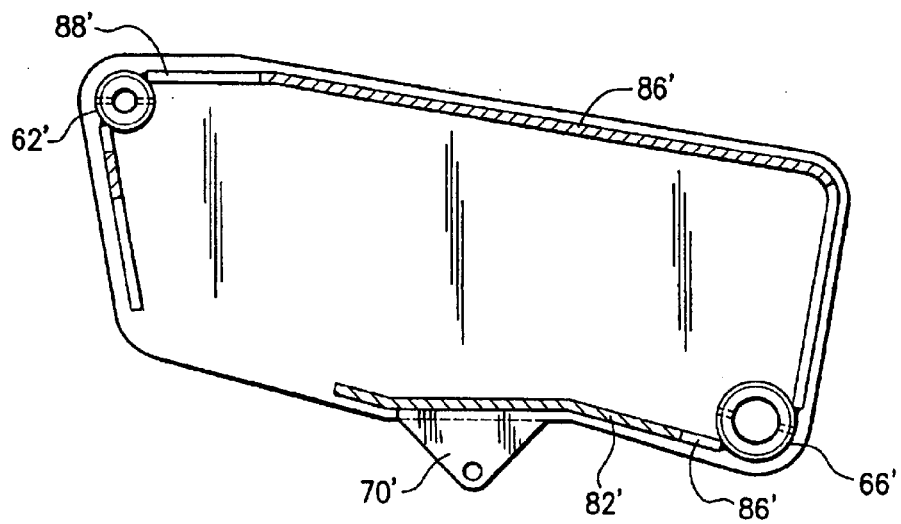
FIG. 9 is a plan view of the lower portion of the body of FIG. 5.

Referring to FIG. 4, the horizontal offsetting of each of the arms 12 and 16 can be seen. A means for moving the body 14 and thus the arms 12 and 16 along the length of the tree trunk 5 is provided. In this example, the moving means is a tower 50 including a pulley 52 at its upper end and a cable 54 attached to a top of the body 14. For example, when the cable 54 is pulled over the pulley 52 it lifts up the body 14 and thus the arms 12 so that it may traverse the length of the tree trunk 5. It is envisaged that other forms of moving means may be provided.

Referring to FIGS. 5 to 9, the body 14 is shown in more detail. The body 14 includes an upper portion 14A that receives arm 12 and a lower portion 14B that receives arm 16. At the very top of the body 14 is a projection 60 for attaching for example the cable 54, for moving the body 14 and arms 12 along the length of the tree trunk 5. The upper portion 14A of the body 14 includes parallel plates 72 and 74 and the lower portion 14B of the body 14 includes a further plate 76 in parallel with plate 74.

In the upper portion 14A between plates 72 and 74 at the front 78 there are a pair of opposed short hollow posts 66. The posts 66 are located in the corner that coincides with the pivot point 22. The short posts 66 are separated by a gap 68. The short hollow posts 66 in conjunction with a hole in the arm 12 and a pin that extends through the hole and into the hollows of each of the short hollow posts 66 form the pivot point 22 about which the curved member 20 pivots.

Extending between the plates 72 and 74 at a corner, opposite the corner that the short hollow posts 66 extend from, are opposed posts 62 that are separated by a narrow gap 64. A lug of the ram 28 sits in the narrow gap 64 and by means of another pin that extends through a hole in the lug and the hollow posts 66 allows the ram 28 to be pivotally connected to the opposed posts 62 and thus the body 14.

At the front 78 of the body 14 and extending between the top plate 72 and the middle plate 74 is a front plate 82. Projecting from the front plate 82 is a pair of coupling means 70 to which is attached the first segment 18A in a fixed relationship. Holes 84 (as seen in FIG. 6) extend through projection 60 through which a bolt can extend to attach the first segment 18A.

A port 84 in the front plate 82 provides a gap through which the curved member 20 passes. A perimeter plate 86 extends from the side of the short hollow posts 66 around the rear of the upper portion 14A of the body 14 to the other side of the body 14 at the short hollow posts 66. A port 84 is provided in the perimeter plate 86 adjacent the gap 64 so as to allow the ram 28 and the lug to pass through so as to pivotally engage with the opposed posts 62.

The lower portion 14B of the body 14, between the middle plate 74 and the lower plate 78 is provided with corresponding features to those in the upper portion 14A so as to allow the attachment of the second arm 16 and ram to the body 14. Like features of the lower portion 14B of the body 14 are indicated with the same reference numerals, but with a prime symbol.

Figures 10, 11:
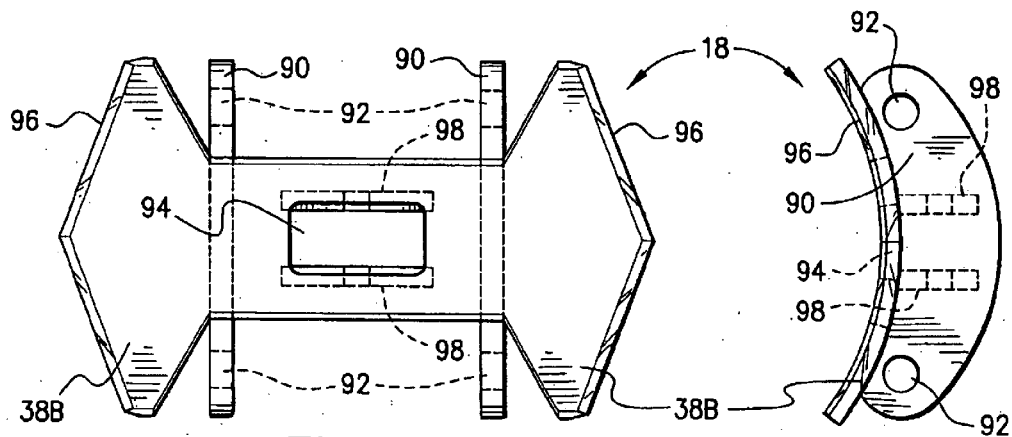
FIG. 10 is a plan view of a segment of the arm of the delimber of FIG. 1.
FIG. 11 is a side elevation of the segment of FIG. 10 turned by 90°.
Figure 12:
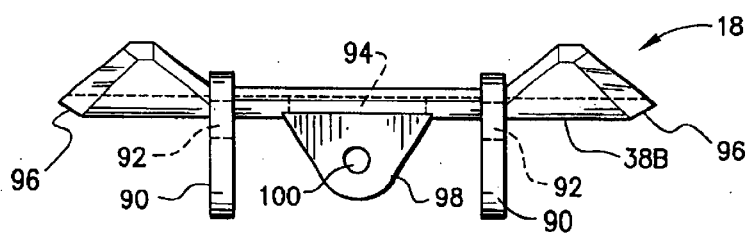
FIG. 12 is an end elevation of the segment of FIG. 11.

Referring to FIGS. 10 to 12, a segment 18 with a large blade 38B is shown. The segment 18 includes a pair of parallel crescent shaped carriers 90 between which extends the large blade 38B. The carriers 90 have holes 92 adjacent each end of each carrier 90 through which passes a bolt to provide a pivotal connection 24 to each adjacent segment 18. A void 94 is provided within the large blade 38B through which passes a roller 36. A pair of lugs 98, extend rearwardly of the large blade 38B. The lugs 98 fix the roller 36 to the blade 38. A hole 100 is provided in each of the lugs 98, through which an axle of the roller 36 can pass to provide a means of attaching the roller 36 to the lugs 98. Each end of the blade 38 is provided with a diamond shaped head that has a sharp end 96. The segments 18 with large blades 38B may be provided with more than one roller.

Figures 13, 14:
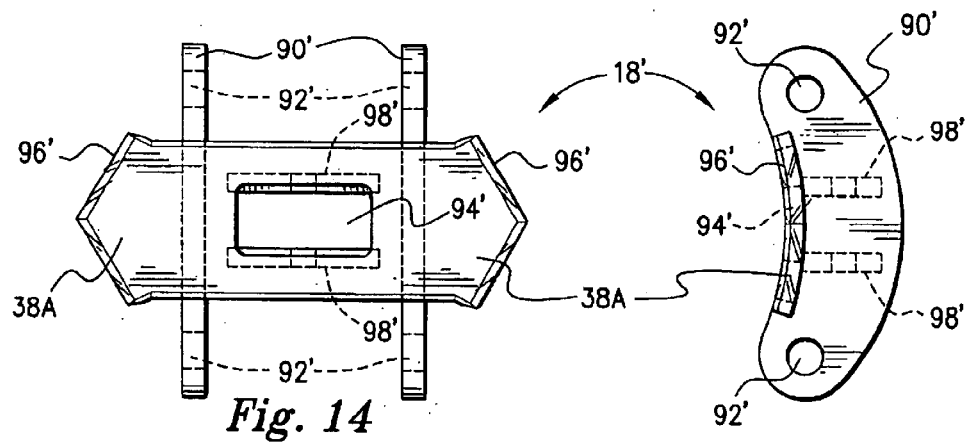
FIG. 13 is a plan view of another segment of the arm of the delimber of FIG. 1.
FIG. 14 is a side elevation of the segment of FIG. 13 turned by 90°.
Figure 15:
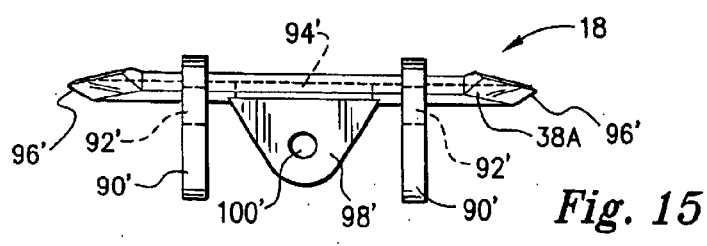
FIG. 15 is an end elevation of the segment of FIG. 14.

Referring to FIGS. 13 to 15, a segment 18 with a small blade 38A is shown. Like features of the segment 18 with the large blade 38B are indicated as the same numerals with a prime symbol. In this case, the small blade 38A is provided with a pointed head that includes a sharp end 96□.

Figure 16:
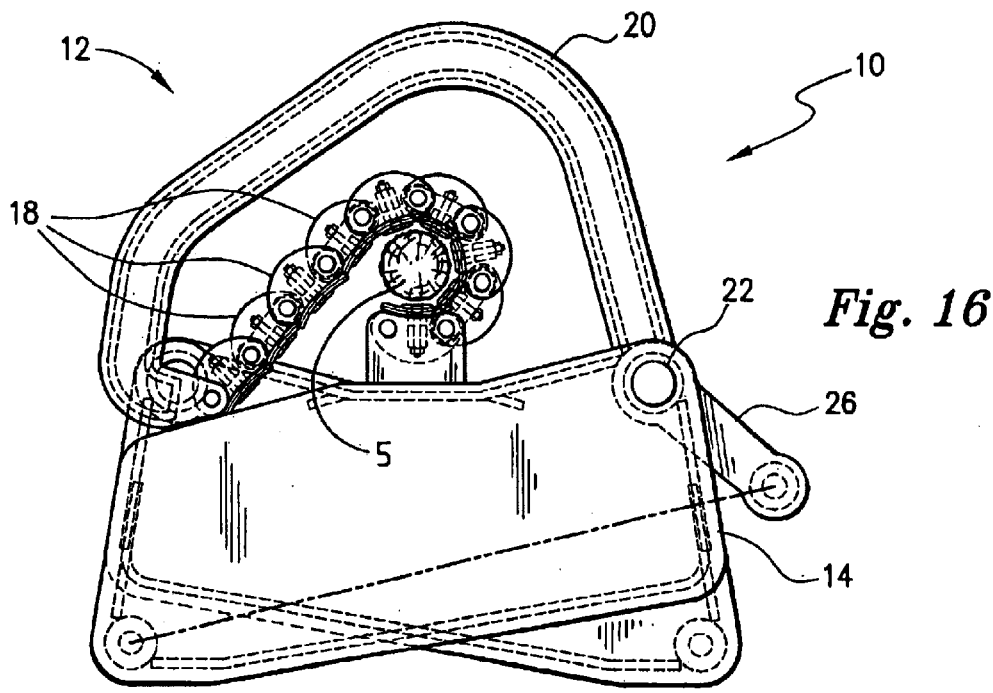
FIG. 16 is a plan view of a second preferred embodiment of the present invention with the arm of the delimber extended around a small sized tree trunk.
Figure 17:
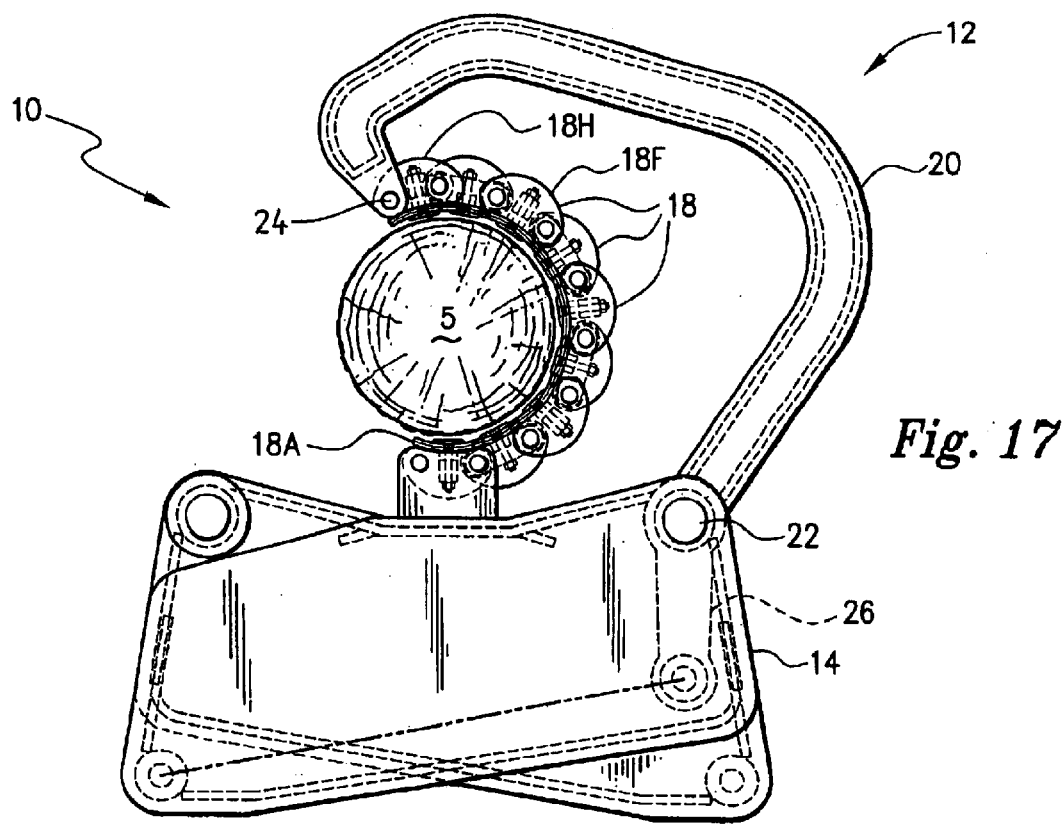
FIG. 17 is a plan view of the delimber of FIG. 16 with the arm extended around a large tree trunk.

Referring to FIGS. 16 and 17 there is shown a second preferred embodiment of the tree delimber 10. Only one of the arms 12 is shown. This embodiment is similar to the previous embodiment, the difference being in the segments 18. In this instance the segments 18 are smaller and there are eight segments forming a chain rather than six in the previous embodiment. Additional segments in the chain are allows for a tighter encirclement of a smaller tree trunk 5. Because there are more segments the end segment in this instance in segment 18H which is pivotally connected at 24 to the curved member 20.

The segments shown in FIG. 18, rather than being provided with rollers, instead have pads 120 for spacing the blades from the exterior surface of the tree trunk 5. The pads 120 slide over the surface of the trunk. In FIGS. 20 and 21 the pads are clearly shown.

In FIG. 19 the linkage between each of the segments in shown. It can be seen that this segment 18F has a large blade 38B and the segment 18G has a small blade 38A. It is also noted that in this embodiment the blades are only on the top part of each of the segments and not on the bottom part.

The method and operation of use of the present invention will now be described with reference to the accompanying drawings.

Each arm 12 and 16 is pivoted so as to separate the arms as much as possible. The body 14 and arms 12 and 16 are positioned adjacent a primary limb, such as, a tree trunk 5. The primary limb need not be a tree trunk. It may be a large relatively straight branch having secondary branches extending therefrom. If any limbs are present on the tree trunk 5 at the location to which the delimber is to be extended around the tree trunk 5 they will need to be manually removed first. The body 14 and thus the arms 12 and 16 are moved so as to locate the first segment 18A to make contact with the tree trunk 5. The rams 28 are activated causing the curved members 20 and 20☐ to pivot and move closer to one another. This causes the segments 18 and 18A to move closer to and eventually extend around the tree trunk 5. Each of the rollers 36 of each of the segments 18 make contact with the tree trunk 5 thereby separating the blades 38 of each of the segments 8 from the tree trunk 5 by a small gap 40. Once the arms 12 and 16 have been fully extended around the tree trunk 5, some or all of the segments 18 of each of the arms 12 will be in contact with the tree trunk 5.

The body 14 and thus the arms 12 and 16 are then moved along the length of the tree trunk 5 so that the blades 38 of the segments 18 lop off any limbs extending from the tree trunk 5. The body 14 may be moved along the length of the tree trunk 5 by, for example, hoisting the body 14 by a cable 54 attached at 60 to the body 14 over a pulley 52 of a tower 50 so as to lift the body 14 upwards.

The hydraulic pressure applied to the rams 28 may be regulated so that a constant pressure is applied by the arms 12 and 16 to the tree trunk 5. As a consequence, as the arms 12 and 16 are moved up the tree trunk 5 and the diameter of the tree trunk reduces, the arms 12 and 16 will move together to compensate.

In the embodiments shown in FIGS. 16 to 21, rather than the roller making contact with the tree trunk as in the case with the previous embodiment, in the second preferred embodiment, the pads 120 of each of the segments 18 make contact with the tree trunk 5 thereby separating the blades 38 of each of the segments from the tree trunk 5 by a small gap.

It will be appreciated that the delimber of the present invention maybe used on a primary limb other than the tree trunk, particularly where the primary limb is a relatively straight large branch that has other limbs protruding from it.

Now that a preferred embodiment of the present invention has been described in detail, the advantages of the present invention will be clear to the skilled addressee. The present invention provides a simple mechanism of delimbing a tree that is far more precise and more efficient than manually removing the limbs. The present invention can handle a range of sizes of tree trunk.

Modifications and variations may be made to the present invention without departing from the basic inventive concept. Such modifications may include:

only having one arm or having more than two arms;
the number of segments in each of the arms may be more than the six depicted in the preferred embodiment;
a guide means may be provided between the top of the tower and body to resist rotation of the body and arms about the tree trunk;
a block and tackle or similar pulley system may be provided between the a top of a tower and the body to increase power applied to the cutting arms; and the means of moving the arms along the length of the tree trunk may be any suitable means.

Such modifications and variations are intended to be within the scope of the present invention, the nature of which is to be judged from the foregoing description.

What is claimed is:

1. A delimber for removing secondary limbs from a primary limb of a tree, the delimber comprising:
    an arm arranged to extend around the primary limb, the arm comprising a cutter oriented to cut the secondary limbs from the primary limb of the tree when the arm is extended around the primary limb and moved along the length of the primary limb, and a spacer for radially spacing the cutter from the primary limb; and
    a mechanism for moving the arm at least partly along the length of the primary limb.

2. The delimber according to claim 1, wherein the primary limb is the trunk of the tree and the secondary limbs are branches of the tree.

3. The delimber according to claim 1, wherein the arm includes a plurality of segments pivotally joined together in sequence.

4. The delimber according to claim 1, wherein the arm is one of a pair of arms arranged to extend around the primary limb.

5. The delimber according to claim 3, wherein each segment is provided with a blade, the blades of the segments collectively forming the cutting means.

6. The delimber according to claim 1, wherein a first segment locates the delimber in relation to the primary limb.

7. The delimber according to claim 1, wherein the arm pivots in relation to the body at a point spaced from the first segment.

8. The delimber according to claim 3, wherein every second segment is provided with a large blade, and the other segments are provided with smaller blades.

9. The delimber according to claim 5, wherein the spacer is in the form of a roller arranged to space at least one of the blades a predetermined distance from the primary limb.

10. The delimber according to claim 4, wherein one of the arms extends around the primary limb in a clockwise direction while the other arm extends around the primary limb in an anticlockwise direction.

11. The delimber according to claim 4, wherein the arms are vertically offset from one another.

12. The delimber according to claim 4, wherein each arm is provided with a spacer for spacing the cutting means a predetermined distance from the primary limb.

13. The delimber according to claim 4, wherein each arm includes a rigid curved member arranged to extend the segments around the trunk, in use, as the curved member is pivoted.

14. The delimber according to claim 6, wherein the first segment is fixed in relation to the body.

15. A method of removing secondary limbs from a primary limb of a tree, including the steps of:
    extending an arm around the primary limb of the tree, the arm comprising a cutter and a spacer for spacing the cutting means from the primary limb;
    moving the arm at least partially along the length of the primary limb thereby causing the cutter of the arm to remove secondary limbs of the primary limb as the arm moves along the length of the primary limb.

16. The delimber according to claim 3, wherein the mechanism for moving the arm comprises a body, the arm being pivotally mounted to the body and the body being arranged to be moved at least partly along the length of the primary limb.

17. The delimber according to claim 16, wherein the mechanism for moving the arm further comprises a cable coupled to the body, the cable arranged to extend at least partly along the length of the primary limb in use and be drawn along substantially parallel with the length of the primary limb.

18. The delimber according to claim 17, wherein the means of the moving the arm further comprises a pulley arranged to be positioned above the body in use so that the cable may be drawn over the pulley to move the body and thus in turn the arm along the length of the primary limb.

19. The delimber according to claim 4, wherein the spacer is in the form of a pad arranged to space at least one of the blades a predetermined distance from the primary limb.

20. The delimber according to claim 5, wherein the spacer is in the form of a roller and a pad arranged to space at least one of the blades a predetermined distance from the primary limb.

21. The delimber according to claim 8, wherein the large blades overlap with the smaller blades.

22. The delimber according to claim 8, wherein each blade has an arrowhead shaped cutting edge.

23. The delimber according to claim 9, wherein the spacer is in the form of a plurality of rollers arranged to space at least one of the blades a predetermined distance from the primary limb.

24. The delimber according to claim 9, wherein the spacer is in the form of plurality of pads arranged to space at least one of the blades a predetermined distance from the primary limb.

25. A delimber for removing secondary limbs from a primary limb of a tree, the delimber comprising:

an arm arranged to extend around the primary limb, the arm comprising a cutter oriented to cut the secondary limbs from the primary limb of the tree when the arm is extended around the primary limb and is moved along the length of the primary limb, and a plurality of segments pivotally joined together in sequence, wherein each segment is provided with a blade, the blades of the segments collectively forming the cutter, wherein every second blade is larger than the smaller blades; and a mechanism for moving the arm at least partly along the length of the primary limb.

26. The delimber according to claim 25, wherein the larger blades overlap with the smaller blades.

27. The delimber according to claim 25, wherein each blade has an arrowhead shaped cutting edge.

28. The delimber according to claim 25, wherein a first segment locates the delimber in relation to the primary limb.

29. The delimber according to claim 25, wherein the arm is provided with a spacer for radially spacing the cutter a predetermined distance from the primary limb.

30. The delimber according to claim 29, wherein spacer is in the form of a roller arranged to offset the cutting means a predetermined distance from the primary limb.

31. The delimber according to claim 29, wherein spacer is in the form of a pad arranged to offset the cutting means a predetermined distance from the primary limb.

32. A delimber for removing secondary limbs from a primary limb of a tree, the delimber comprising:

an arm arranged to extend around the primary limb, the arm comprising a cutter oriented to cut the secondary limbs from the primary limb of the tree when the arm is extended around the primary limb of the tree and is moved along the length of the primary limb, and a plurality of segments pivotally joined together in sequence, wherein each segment is provided with a blade, wherein every second blade overlaps with a blade therebetween; and a mechanism for moving the arm at least partly along the length of the primary limb.

33. The delimber accordingly to claim 32, wherein every second segment is provided with a large blade, and the other segments are provided with smaller blades.

34. The delimber according to claim 32, wherein each blade has an arrowhead shaped cutting edge.

35. The delimber according to claim 32, wherein each arm is provided with a spacer for radially spacing the cutter a predetermined distance from the primary limb.

36. The delimber according to claim 33, wherein the large blades overlap with the smaller blades.

37. The delimber according to claim 35, wherein the spacer is in the form of a roller arranged to space at least one of the blades a predetermined distance from the primary limb.

38. The delimber according to claim 35, wherein the spacer is in the form of a pad arranged to space at least one of the blades a predetermined distance from the primary limb.

39. A method of removing secondary limbs from a primary limb of a tree, including the steps of:

extending an arm around the primary limb of the tree, the arm comprising a cutter comprised of a plurality of blades pivotally coupled together in sequence with every second blade being larger than other smaller blade therebetween; and moving the arm at least partially along a length of the primary limb thereby causing a cutting means of the arm to remove secondary limbs of the primary limb as the arm moves along the length of the primary limb.

40. A method of removing secondary limbs from a primary limb of a tree, including the steps of:

extending an arm around the primary limb of the tree, the arm comprising a cutter comprised of a plurality of blades pivotally coupled together in sequence with every second blade overlapping with the blade therebetween; and moving the arm at least partially along a length of the primary limb thereby causing a cutting means of the arm to remove secondary limbs of the primary limb as the arm moves along the length of the primary limb.

41. A delimber for removing secondary limbs from a primary limb of a tree, the delimber comprising:

an arm arranged to extend around the primary limb, the arm comprising a plurality of cutting segments pivotally connected in a chain, each segment having a cutting blade oriented to cut the secondary limbs from the primary limb of the tree when the arm is extended around the primary limb and moved along a length of the primary limb, wherein every second blade is larger than the other smaller blades; and a mechanism for moving the arm at least partly along the length of the primary limb.

42. A delimber for removing secondary limbs from a primary limb of a tree, the delimber comprising:

an arm arranged to extend around the primary limb, the arm comprising a plurality of cutting segments pivotally connected in a chain, each segment having a cutting blade oriented to cut the secondary limbs from the primary limb of the tree when the arm is extended around the primary limb and moved along a length of the primary limb, wherein every second blade overlaps with a blade therebetween; and a mechanism for moving the arm at least partly along the length of the primary limb.

* * * * *